United States Patent
Gama et al.

(10) Patent No.: US 7,628,607 B2
(45) Date of Patent: Dec. 8, 2009

(54) GAS COOKING APPLIANCE

(75) Inventors: Atsuhito Gama, Nagoya (JP);
Shinichiro Hata, Nagoya (JP); Hiroyuki Yamada, Nagoya (JP); Kazuya Hirota, Nagoya (JP)

(73) Assignee: Rinnai Corporation, Nagoya-shi (JP)

( * ) Notice: Subject to any disclaimer, the term of this patent is extended or adjusted under 35 U.S.C. 154(b) by 389 days.

(21) Appl. No.: 11/076,492

(22) Filed: Mar. 9, 2005

(65) Prior Publication Data
US 2005/0199232 A1 Sep. 15, 2005

(30) Foreign Application Priority Data
Mar. 11, 2004 (JP) ............... 2004-068535

(51) Int. Cl.
*A01G 13/06* (2006.01)
(52) U.S. Cl. ............... 431/18; 431/13; 431/63; 126/39 BA
(58) Field of Classification Search ............... 126/39 B, 126/39 R, 39 N; 431/12, 13, 18, 24, 25, 26, 431/62, 63, 69
See application file for complete search history.

(56) References Cited

U.S. PATENT DOCUMENTS

| 3,941,553 | A  | * | 3/1976 | Bedford ............... 431/80 |
| 6,428,308 | B1 | * | 8/2002 | Bird et al. ............... 431/18 |
| 6,619,613 | B1 | * | 9/2003 | Akamatsu et al. ...... 251/129.04 |

FOREIGN PATENT DOCUMENTS

| EP | 1 152 190 A1 | 11/2001 |
| JP | 04-096693 | 3/1992 |
| JP | 2000-179860 | 6/2000 |
| JP | 2003-130333 | 5/2003 |
| JP | 2003-222327 | 8/2003 |
| JP | 2003-254534 | 9/2003 |

* cited by examiner

*Primary Examiner*—Alfred Basichas
(74) *Attorney, Agent, or Firm*—Rankin, Hill & Clark LLP

(57) ABSTRACT

A microcomputer 51 of an electronic circuit unit 50 actuates an electric motor (stepping motor) 20 driving a thermal power control valve of a burner during or just after extinguishment of the burner to displace the thermal power control valve to an opening degree position for ignition. In this way, the delay of the start of an ignition process of the burner for an ignition request can be eliminated to start the ignition process promptly.

3 Claims, 8 Drawing Sheets

GAS COOKING APPLIANCE

BACKGROUND OF THE INVENTION

1. Field of the Invention

The present invention relates to a gas cooking appliance in which a thermal power control valve of a burner is driven by an electric motor such as a stepping motor.

2. Description of the Related Art

For this type of gas cooking appliance, those found in, for example, Japanese Patent Laid-Open No. 2000-179860 (patent document 1) and Japanese Patent Laid-Open No. 2003-130333 (patent document 2) have been known. In the gas cooking appliance found in patent documents 1 and 2, a thermal power control valve of a burner is driven by a stepping motor.

In the gas cooking appliance found in patent document 1, as shown in FIG. 17 of the document, the thermal power control valve is displaced to a closed position by the stepping motor when the burner is extinguished, and the thermal power control valve is displaced by the stepping motor to a middle/high position which is a displacement position for ignition of the burner when an instruction to ignite the burner is provided. In the gas cooking appliance found in patent document 2, as shown in FIG. 5 of the document, the thermal power control valve is displaced to a home position (closed position) by the stepping motor, and then the thermal power control valve is displaced to a middle fire position which is a displacement position of the thermal power control valve for ignition of the burner when an ignition instruction is provided.

In techniques found in the patent documents 1, 2, the thermal power control valve is displaced from a position on the closed side to a position for ignition when the burner is ignited as described above. Hence, there is a disadvantage that when a user of the gas cooking appliance performs an ignition instruction operation, an ignition process of the burner (supply of gas to the burner and actuation of an ignition device) is not started until the thermal power control valve is displaced to the position for ignition, thus causing a time delay before an actual ignition process of the burner is started for the ignition instruction operation by the user. In particular, for the gas cooking appliance comprising a plurality of stepping motors wherein the stepping motors are not concurrently actuated, but actuated one after another according to a predetermined order of priority as in the technique found in patent document 1, the start of the ignition process of burners of lower priority orders is considerably delayed when ignition instruction operations are almost concurrently performed for a plurality of burners.

The present invention has been made in view of the background described above, and its object is to provide a gas cooking appliance comprising a thermal power control valve driven by an electric motor such as a stepping motor, wherein the delay of the start of the ignition process of the burner for an ignition request can be eliminated to start the ignition process promptly.

SUMMARY OF THE INVENTION

For achieving the object described above, a gas cooking appliance of the present invention is a gas cooking appliance comprising a thermal power control valve provided in a gas flow channel to a burner for controlling the thermal power of the burner, an electric motor for driving the thermal power control valve, and control means for controlling the electric motor via a motor drive circuit, wherein the control means comprises extinguishing time motor controlling means for actuating the electric motor so that the thermal power control valve is displaced to an ignition position predetermined as a displacement position of the thermal power control valve when the burner is ignited, at least during or just after extinguishment of the burner.

According to the gas cooking appliance of the present invention, the thermal power control valve is displaced to the ignition position by actuating the electric motor by the extinguishing time motor control means during or just after extinguishment of the burner. Hence, when a next request is made for ignition of the burner, the thermal power control valve is already displaced to the ignition position in principle. Thus, the ignition process of the burner (supply gas to the burner and actuation of an ignition device such as an igniter) can be promptly started upon the ignition request.

Thus, according to the present invention, the delay of the start of the ignition process of the burner for the ignition request can be eliminated to start the ignition process promptly.

In the present invention, when the electric motor is a stepping motor which is operated by supplying pulses thereto via the motor drive circuit, the relative amount of displacement (relative amount of change in opening degree) of the thermal power control valve is restrained by the number of pulses supplied to the stepping motor. Hence, for displacing the thermal power control valve to a desired opening degree, it is necessary to displace the thermal power control valve to a home position such as its fully closed position or fully opened position (a position relative to the position of displacement of the thermal power control valve) (make so called a shift to the home position) when electric source power is supplied to at least the control means and motor drive circuit In this case, when the shift to the home position is performed, if the thermal power control valve is displaced to a position considerably distant from the ignition position, the amount of displacement of the thermal power control valve increases for displacing the thermal power control valve to the ignition position when a request for ignition of the burner is made subsequently, and hence the start of the ignition process is delayed.

Thus, in the present invention, when the electric motor is a stepping motor which is operated by supplying pulses thereto via the motor drive circuit, the control means preferably comprises means for actuating the stepping motor so that the thermal power control valve is displaced to a predetermined home position when electric source power is supplied to at least the control means and the motor drive circuit, and means for actuating the stepping motor just thereafter so that the thermal power control valve is displaced to the ignition position or a position close thereto.

Hence, the thermal power control valve is displaced to the ignition position or a position close thereto just after the thermal power control valve is displaced to the home position (just after the thermal power control valve is shifted to the home position). Thus, when a request is made for ignition of the burner, the ignition process of the burner can be started without displacing the thermal power control valve to the ignition position, or by displacing the thermal power control valve to the ignition position by only a very small amount. That is, the ignition process of the burner can be promptly started for the ignition request.

The gas cooking appliance of the present invention is suitable if it comprises a plurality of sets of the burner, thermal power control valve, electric motor and motor drive circuit.

That is, for any burner, the ignition process can be started without considerably displacing the thermal power control valve when a request is made for ignition of the burner, and therefore the ignition process of a plurality of burners can be promptly started even if requests are almost concurrently made for ignition of the plurality of burners.

DETAILED DESCRIPTION OF THE PREFERRED EMBODIMENTS

One embodiment of the present invention will be described with reference to FIGS. 1 to 8.

Figure 1:
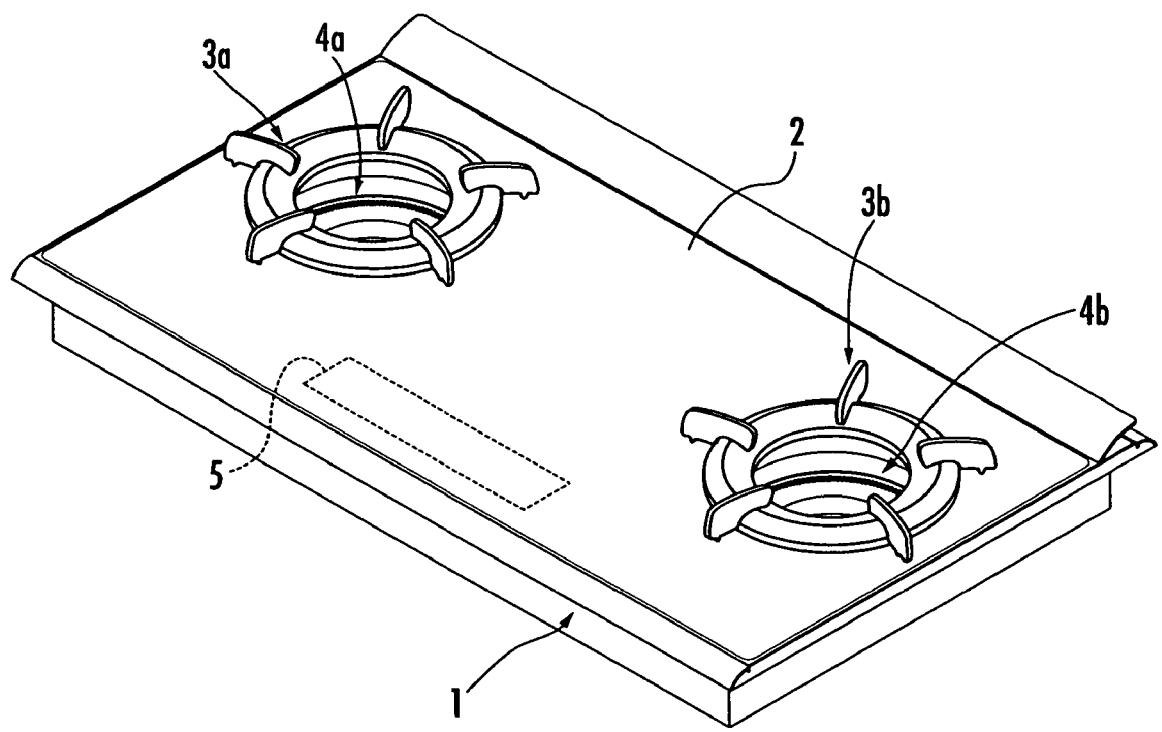
FIG. 1 is a schematic perspective view of an example of a gas cooking appliance of the present invention.
Figure 2:
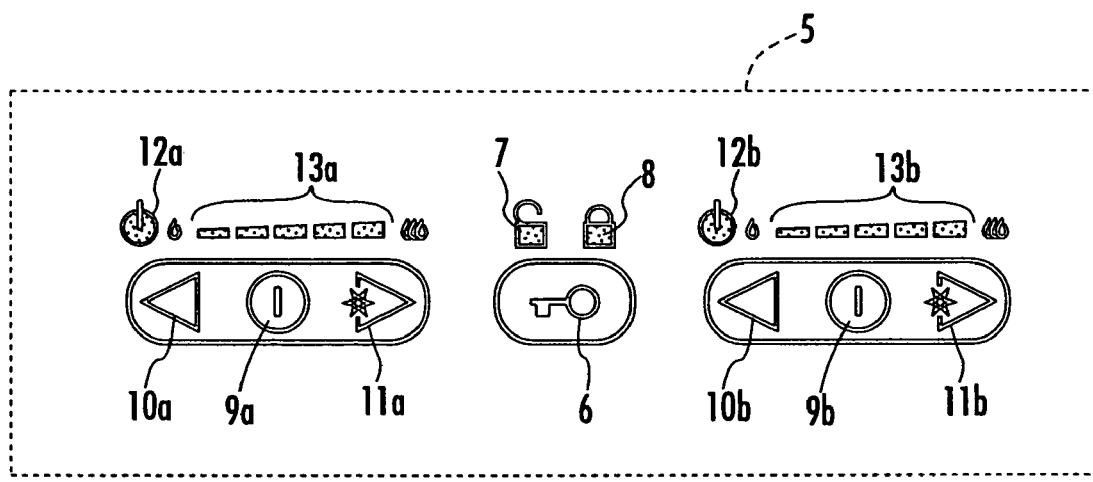
FIG. 2 is a plan view of an operation/display portion provided in the gas cooking appliance of FIG. 1.

FIG. 1 is an outline perspective view of a gas cooking appliance 1, and FIG. 2 is a plan view of an operation/display portion of the gas cooking appliance 1. Referring to these drawings, the gas cooking appliance 1 comprises burners 4a, 4b below two trivets 3a, 3b placed in a top plate 2 of the gas cooking appliance 1, respectively, in this embodiment. An operation/display portion 5 is provided at a center of the top plate 2 on the front side. The operation/display portion 5 comprises a switch 6 and display lamps 7, 8 associated with actuation of the entire gas cooking appliance 1, switches 9a, 10a, 11a and display lamps 12a, 13a associated with actuation of the burner 4a, and switches 9b, 10b, 11b and display lamps 12b, 13b associated with actuation of the burner 4b. In this embodiment, the gas cooking appliance 1 uses a domestic or commercial alternating-current power source as its main power supply.

The switch 6 is an operation switch for switching between an "operating state" in which an instruction (operation) to actuate the burners 4a, 4b is enabled and a "standby" state in which the actuation instruction is disabled when main power is supplied to the gas cooking appliance, the switches 9a, 9b are operation switches for bringing the corresponding burners 4a, 4b into an ignition preparation state (ignition instruction standby state), the switches 10a, 10b are operation switches for reducing thermal powers of the corresponding burners 4a, 4b (gas flows to the burners 4a, 4b), and the switches 11a, 11b are operation switches for increasing thermal powers of the corresponding burners 4a, 4b. In this case, in this embodiment, the switches 11a, 11b also serve as operation switches for providing instructions to ignite the corresponding burners 4a, 4b.

In this embodiment, the burner 4a or 4b is brought into the ignition preparation state when the switch 9a or 9b is operated after the gas cooking appliance 1 is brought into the "operating state" by operation of the switch 6. When the switch 11a is operated when the burner 4a is in the ignition preparation state, for example, the ignition process of the burner 4a is carried out. Moreover, by operating the switch 10a or 11a during burning of the burner 4a, the thermal power of the burner 4a can be set in five stages. If the switch 9a or 6 is operated during the burning operation of the burner 4a, the extinguishment process of the burner 4a is carried out. Such a relation between the actuation of the burner 4a and the operation of the switches 6, 9a, 10a, 11a is same for the burner 4b, and the burner 4b is actuated in the same manner as described above by the operation of the switches 6, 9b, 10b, 11b. Additionally, irrespective of which of the burners 4a and 4b is burning, the burning burner is extinguished if the switch 6 is operated (the gas cooking appliance 1 is brought into the "standby state"). Thus, the burning operation of the burners 4a, 4b is enabled only in the "operating state" of the gas cooking appliance 1, and both the burners 4a, 4b are disabled in the "standby state".

The display lamp 7 is a lamp indicating by lighting that the gas cooking appliance 1 is in the operating state, and the display lamps 12a and 12b are lamps indicating by lighting that the corresponding burners 4a, 4b are in the ignition preparation state and under the burning operation, in other words that the burning operations of the corresponding burners 4a, 4b are enabled. The display lamps 13a, 13b are lamps indicating the levels of thermal powers of the corresponding burners 4a, 4b when they are burning. In this embodiment, the display lamps 13a, 13b have arranged five LEDs corresponding to five kinds of thermal powers settable for the burners 4a, 4b, wherein an LED corresponding to the set thermal power is lighted. The display lamp 8 is a lamp indicating by lighting so called a child lock state in which the switch 6 is continuously operated for a predetermined time period (e.g. 4 seconds) or longer in the standby state of the gas cooking appliance 1, and thus all operations of the gas cooking appliance 1 (except for necessary operations of the switch 6) are disabled. The child lock state is unlocked by continuously operating the switch 6 again for a predetermined time period (e.g. 4 seconds) or longer.

Figure 3:
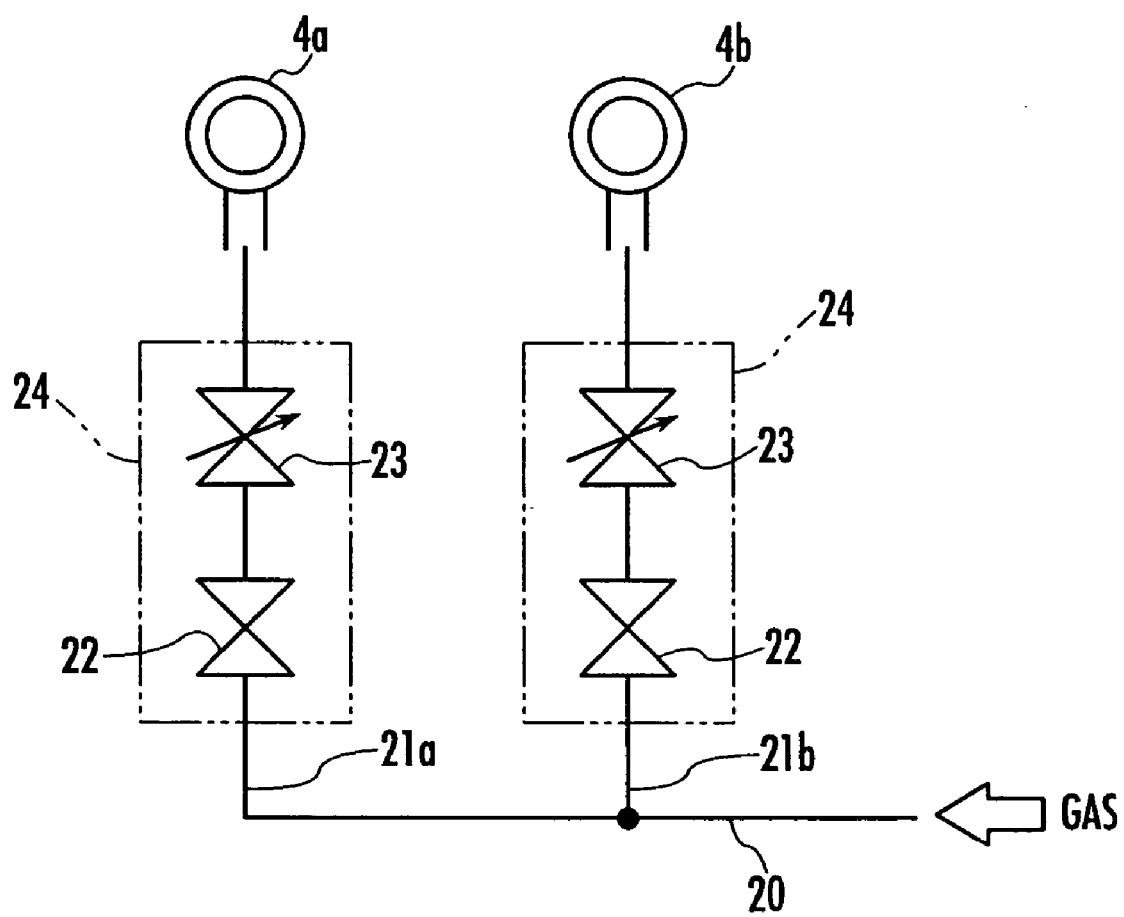
FIG. 3 schematically shows the configuration of a gas flow channel in the gas cooking appliance of FIG. 1.

FIG. 3 schematically shows the configuration of a gas flow channel of the gas cooking appliance 1. In the gas flow channel, gas is supplied to the burners 4a, 4b via gas flow channels 21a, 21b for the burners 4a, 4b, respectively, branched off a main gas flow channel 20 common for both burners 4a, 4b. The gas flow channels 21a, 21b are each provided with a valve unit 24 comprising an electromagnetic valve 22 for opening and closing the gas flow channel and a thermal power control valve 23 (flow control valve) for controlling a gas flow. The structure of the valve unit 24 is the same for both burners 4a, 4b.

Figure 4:
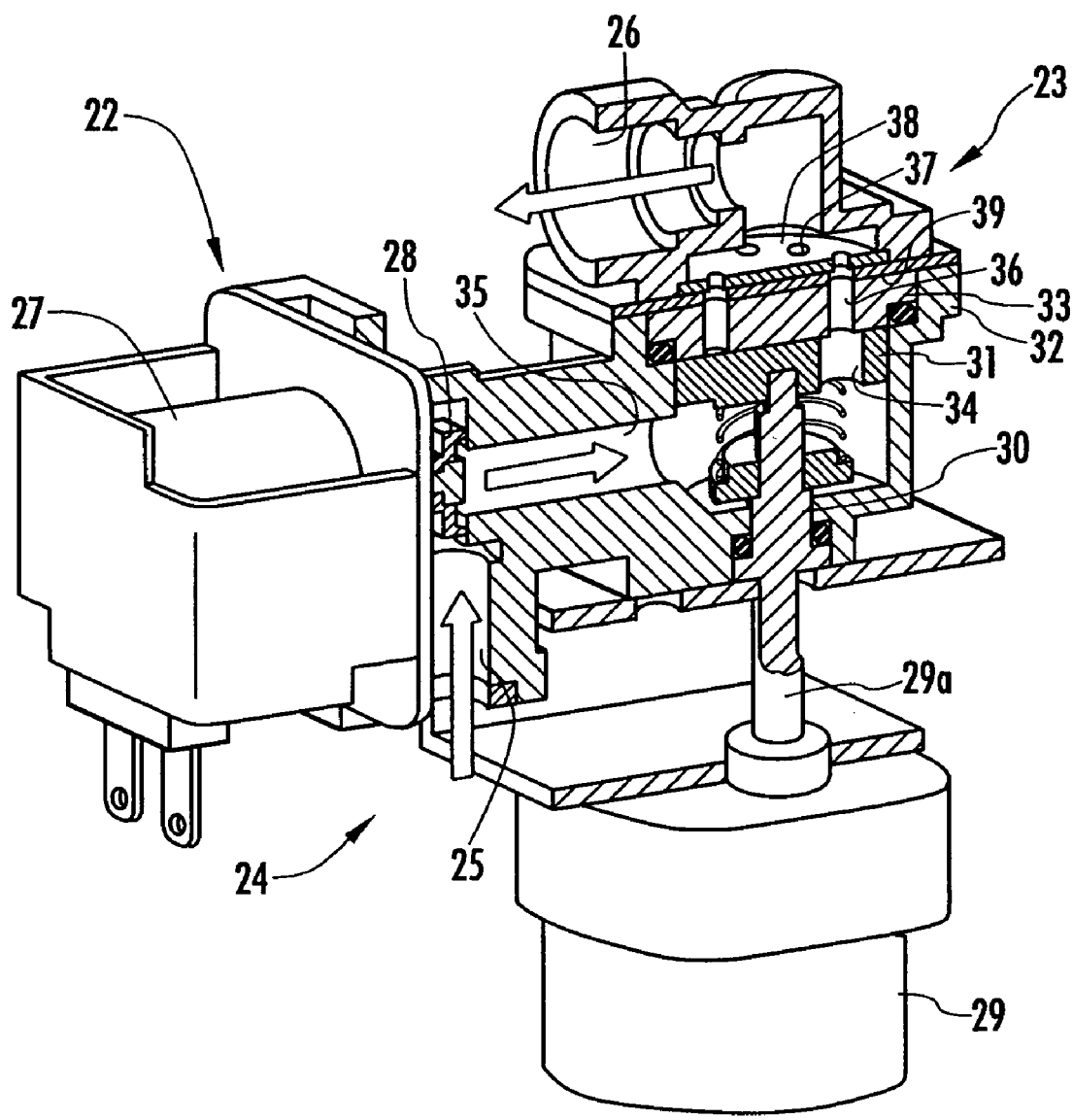
FIG. 4 is perspective view showing a cutaway view of the structure of a valve unit as the motor-operated valve apparatus provided in the gas cooking appliance of FIG. 1.
Figure 5:
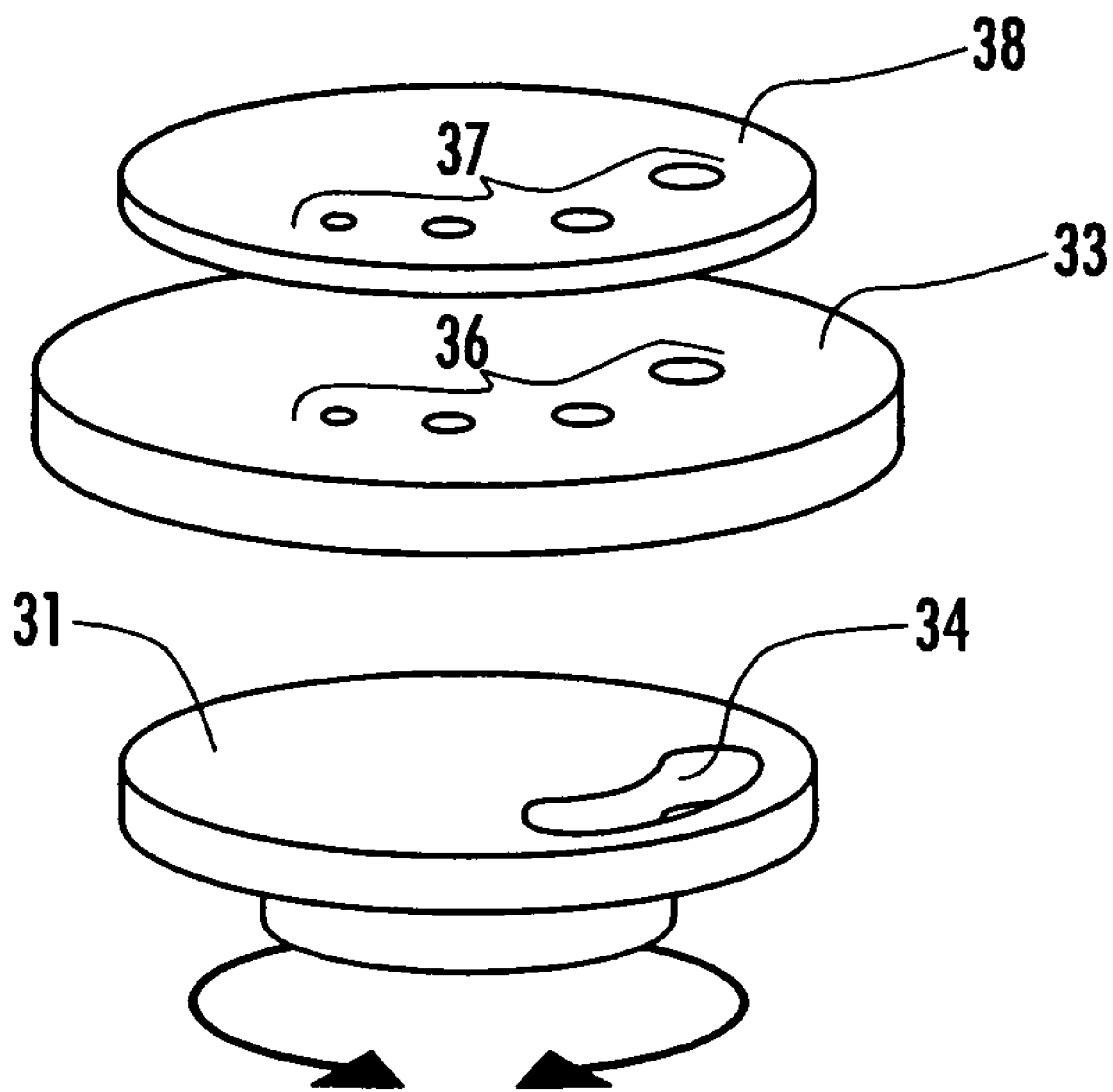
FIG. 5 is a perspective view showing the configuration of main portions of the valve unit of FIG. 4.

The outlined structure of the valve unit 24 will be described with reference to FIGS. 4 and 5. FIG. 4 is a perspective view showing a partial cutaway view of the valve unit 24, and FIG. 5 is an exploded perspective view of main members of the valve unit 24. The void arrow in FIG. 4 shows a direction of gas flow from an entrance channel 25 of the valve unit 24 to an exit channel 26.

The valve unit 24 comprises the electromagnetic valve 22 placed in such a manner that a valve body 28 which is opened by passage of an electric current through a solenoid portion 27 faces the entrance channel 25, and also comprises as main components of the thermal power control valve 23 a disk-shaped rotation plate 31 coupled via a rotation shaft 30 to a drive shaft 29a of a stepping motor 29 and rotatably provided integrally with the drive shaft 29a, and a disk-shaped fixed plate 33 contacting the upper surface of the rotation plate 31 in a slid manner and fixed to a housing 32 of the valve unit 24. The valve body 28 of the electromagnetic valve 22 given impetus toward the closed side by a spring (not shown), and passage of an electric current through the solenoid portion 27 is stopped to close the valve.

As shown in FIG. 5, the rotation plate 31 of the thermal power control valve 23 is provided with a long gas passage hole 34 extending along the circumferential direction (rotation direction), and the gas passage hole 34 communicates with a channel 35 of the electromagnetic valve 22 on the exit side. The fixed plate 33 is provided with a plurality of gas passage holes 36 arranged along the circumferential direction, and the gas passage holes 36 communicate with the exit channel 26 of the valve unit 24. The gas passage holes 36 of the fixed plate 33 are such that by rotating the rotation plate 31 by the stepping motor 29, the gas passage hole 34 of the rotation plate 31 communicates with one or more of the gas passage holes 36 of the fixed plate 33. At this time, the number or combination of gas passage holes 36 of the fixed plate 33 communicating the gas passage hole 34 is changed with the rotation position of the rotation plate 31, whereby the effective opening area (opening degree) of the gas channel constituted by the gas passage hole 34 of the rotation plate 31 and the gas passage holes 36 of the fixed plate 33 communicating therewith is changed. In this case, the rotation plate 31 has its rotation range (motion range) mechanically restrained by a stopper (not shown) provided in the housing 32 of the valve unit 24 or the like, and can be rotated in a range between a rotation position in which the opening degree of the gas flow channel constituted by the gas passage holes 34 of the rotation plate 31 and the gas passage holes 36 of the fixed plate 33 is a predetermined minimum opening degree (hereinafter referred to as minimum opening degree rotation position) and a rotation position in which the opening degree is a predetermined maximum opening degree (hereinafter referred to as maximum opening degree rotation position).

A disk-shaped orifice plate 38 provided with a plurality of gas passage holes 37 communicating with the gas passage holes 36 of the fixed plate 33, respectively, is detachably attached via a seal member 39 to the upper surface of the fixed plate 33. The orifice plate 39 is to adjust the effective opening area of the gas passage hole 36 of the fixed plate according to the type of gas used, and the diameter of the gas passage hole 37 is consistent with the type of gas.

Figure 6:
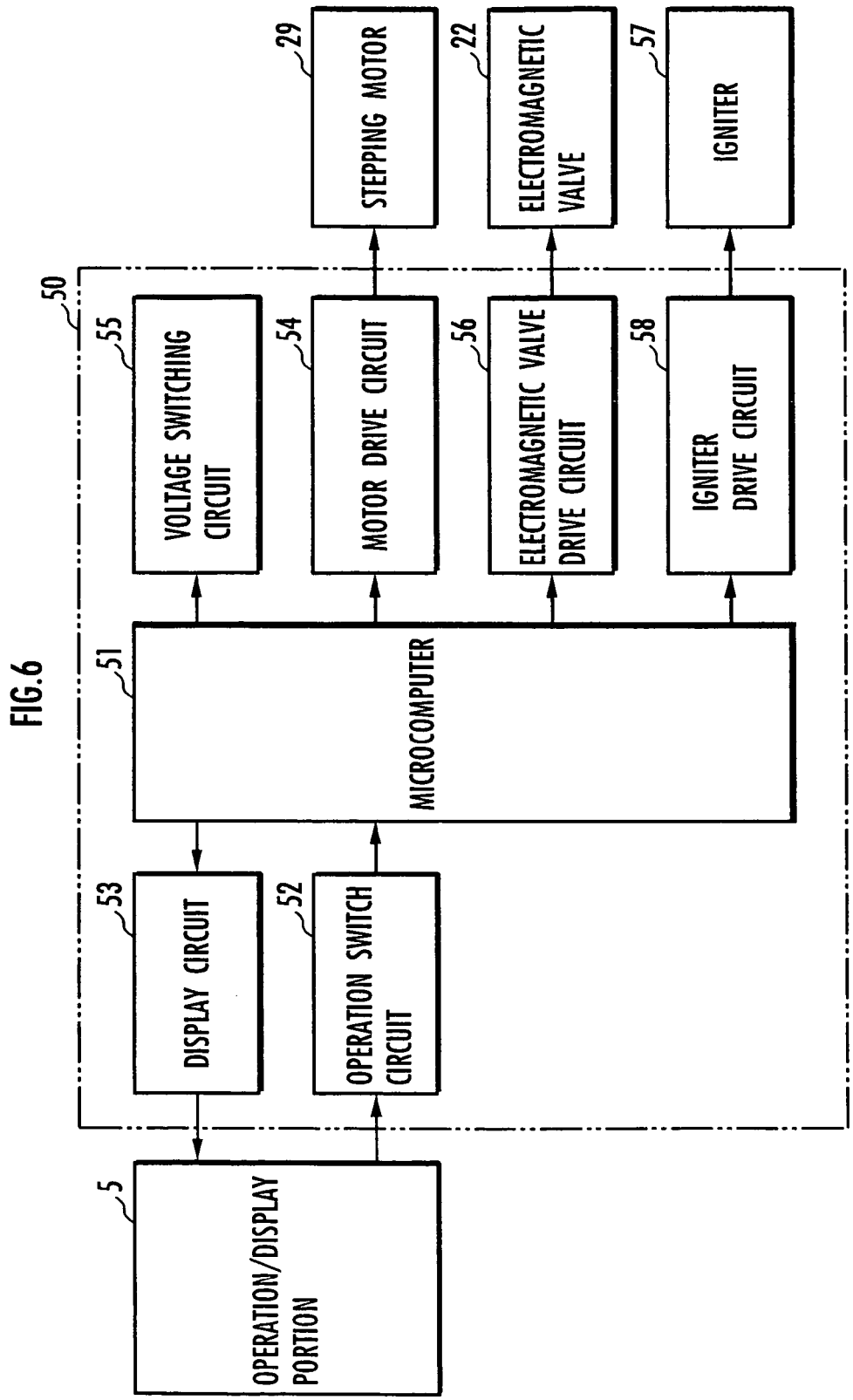
FIG. 6 is a block diagram showing the configuration of an electronic circuit unit provided in the gas cooking appliance of FIG. 1.

FIG. 6 is a block diagram showing the main configuration of an electronic circuit unit 50 provided in the gas cooking appliance 1 for controlling the operation of the gas cooking appliance 1. As shown in the figure, the electronic circuit unit 50 comprises a microcomputer 51, an operation switch circuit 52 generating operation signals of the switches 6, 9a to 11a and 9b to 11b of the operation/display panel 5 and inputting the signals to the microcomputer 51, a display circuit 53 driving the display lamps 7, 8, 12a, 13a, 12b, 13b of the operation/display panel 5 according to an instruction from the microcomputer 51, a motor drive circuit 54 supplying drive pulses to the stepping motors 29 of the valve units 24 according to an instruction from the microcomputer 51, a voltage switching circuit 55 switching the voltage level of the drive pulse generated by the motor drive circuit 54 according to an instruction from the microcomputer 51, an electromagnetic valve drive circuit 56 driving the electromagnetic valves 22 according to an instruction from the microcomputer 51, and an igniter drive circuit 58 driving an igniter (ignition device) 57 for igniting the burners 4a, 4b according to an instruction from the microcomputer 51. In this embodiment, the voltage of the pulse supplied from the motor drive circuit 54 to the stepping motor 29 can be switched between two levels: a high level and a low level, by the voltage switching circuit 55. The motor drive circuit 54 and the electromagnetic valve drive circuit 56 are provided separately for each stepping motor 29 and each electromagnetic valve 22.

Although not shown in FIG. 6, detection signals from a sensor detecting ignition of the burners 4a, 4b and a sensor detecting occurrence of various abnormal events in the gas cooking appliance 1 are input to the microcomputer 51, in addition to operation signals of the switches 6, 9a to 11a and 9b to 11b of the operation/display panel 5. In this embodiment, the gas cooking appliance 1 is provided with a buzzer and its drive circuit (not shown), and the buzzer is appropriately actuated according to an instruction from the microcomputer 51. The microcomputer 51 controls the operations of the display lamps 7, 8, 12a, 13a, 12b, 13b, the stepping motor 29, the electromagnetic valve 22, the igniter 57 and the like based on input signals and programs stored and held in advance. Hereinafter, the stepping motor 29 is referred to simply as motor 29.

In addition, the microcomputer 51 represents control means in the present invention, and includes means for the present invention such as extinguishing time motor controlling means.

Actuation of the gas cooking appliance 1 of this embodiment will now be described with reference to flowcharts of FIGS. 7 and 8. The basic actuation of the gas cooking appliance 1 for the operations of the burners 4a, 4b, and therefore the following description is intended mainly for the operation of the burner 4a, for example. In the following description, five stage thermal powers settable for the burners 4a, 4b are referred to as thermal power 1, thermal power 2, . . . , thermal power 5 in ascending order with the first thermal power the lowest. Thus, the opening degree of the thermal power control valve (defined by the rotation position of the rotation plate 31) corresponding to each thermal power N (N=1, 2, . . . , 5) increases with the value of N. Additionally, the opening degree of the thermal power control valve 23 corresponding to the thermal power 1 is an opening degree slightly larger than the minimum opening degree of the thermal power control valve 23 which is mechanically restrained, and the opening degree of the thermal power control valve 23 corresponding to the thermal power 5 is an opening degree slightly smaller than the maximum opening degree of the thermal power control valve 23 which is mechanically restrained. In this embodiment, the opening degree of the thermal power control valve 23 corresponding to the thermal power 4 is an opening degree predetermined as an opening degree during ignition of each burner 4a (this is equivalent to the ignition position in the present invention, and may be hereinafter referred to as an opening degree for ignition). The rotation position of the rotation plate 31 of the thermal power control valve 23 corresponding to the thermal power 4 is a rotation position closer to the maximum opening degree rotation position of the minimum opening degree rotation position and the maximum opening degree rotation position.

When the gas cooking appliance 1 is connected to a domestic or commercial alternating-current power source to start the supply of main power to the gas cooking appliance 1 (including the electronic circuit unit 50) at STEP 1, processes of STEPs 2 and 3 are first carried out by the control operation of the microcomputer 51. The processes are for a shift to home position of the thermal power control valve 23. For explanation, the voltage switching circuit 55 sets the voltage of the pulse supplied to each motor 29 to a low level voltage according to an instruction from the microcomputer 51. In this state, the microcomputer 51 instructs the motor drive circuit 54 to supply a predetermined number of pulses to each motor 29, whereby the thermal power control valves 23 associated with the burners 4a, 4b are displaced to their home positions. In this embodiment, the home position of each thermal power control valve 23 is a position corresponding to the minimum opening degree rotation position of the rotation plate 31, i.e. the displacement position of the minimum opening degree of the thermal power control valve 23. The number of pulses supplied to each motor 29 (the predetermined number is hereinafter referred to as the number of pulses for shift to the home position) is the number of pulses required for rotating the rotation plate 31 of each thermal power control valve 23 from the maximum opening degree rotation position to the minimum opening degree rotation position (displacing the thermal power control valve 23 from the maximum opening degree to the minimum opening degree) plus several pulses (e.g. 15 to 20 pulses) as an allowance. That is, the number of pulses for shift to the home position is a number of pulses allowing the rotation plate 31 to be rotated by an angle slightly larger than a total angle of rotation of the rotation plate 31 from the maximum opening degree rotation position to the minimum opening degree rotation position. A minimum necessary number of pulses required for rotating the rotation plate 31 of the thermal power control valve 23 from the maximum opening degree rotation position to the minimum opening degree rotation position can be determined from the total angle of rotation and an angle of rotation of the rotation plate 31 per pulse to the motor 29.

As described in detail later, in this embodiment, when the process of STEP 2 is carried out, the opening degree of the thermal power control valve 23 is basically an opening degree close to the maximum opening degree.

Then, at STEP 3, the voltage switching circuit 55 sets the voltage of the pulse supplied to each motor 29 to a high level voltage according to an instruction from the microcomputer 51. In this state, the microcomputer 51 instructs the motor drive circuit 54 to drive each motor 29 to a position corresponding to the thermal power 5. In this case, the number of pulses supplied from the motor drive circuit 54 to each motor 29 is a number of pulses equivalent to an angle of rotation from the minimum opening degree rotation position of the rotation plate 31 of the thermal power control valve 23 corresponding to each motor 29 to the rotation position of the rotation plate 31 corresponding to the thermal power 5.

The processes of STEPs 2, 3 described above are carried out concurrently for each of the motor 29 on the burner 4a side and the motor 29 on the burner 4b side. These processes are not necessarily carried out concurrently for each motor 29, but may be carried out one after another (the processes of STEPs 2, 3 are carried out for one motor 29, flowed by carrying out the processes of STEPs 2, 3 for the other motor 29).

With completion of the processes of STEPs 2, 3, the gas cooking appliance 1 is brought into the standby state (STEP 4). In this standby state, the microcomputer 51 checks whether the switch 6 of the operation/display portion 5 is operated or not by output signals of the operation switch circuit 52 at STEP 5. If the switch 6 is operated, the microcomputer 51 carries out the process of STEP 6 to temporarily sound the buzzer (not shown) and light the display lamp 7 (turn the buzzer and the display lamp 7 on). Thus, the gas cooking appliance 1 is brought into the operating state (STEP 7). If the switch 6 is not operated in the standby state, the standby state continues.

Figure 7:
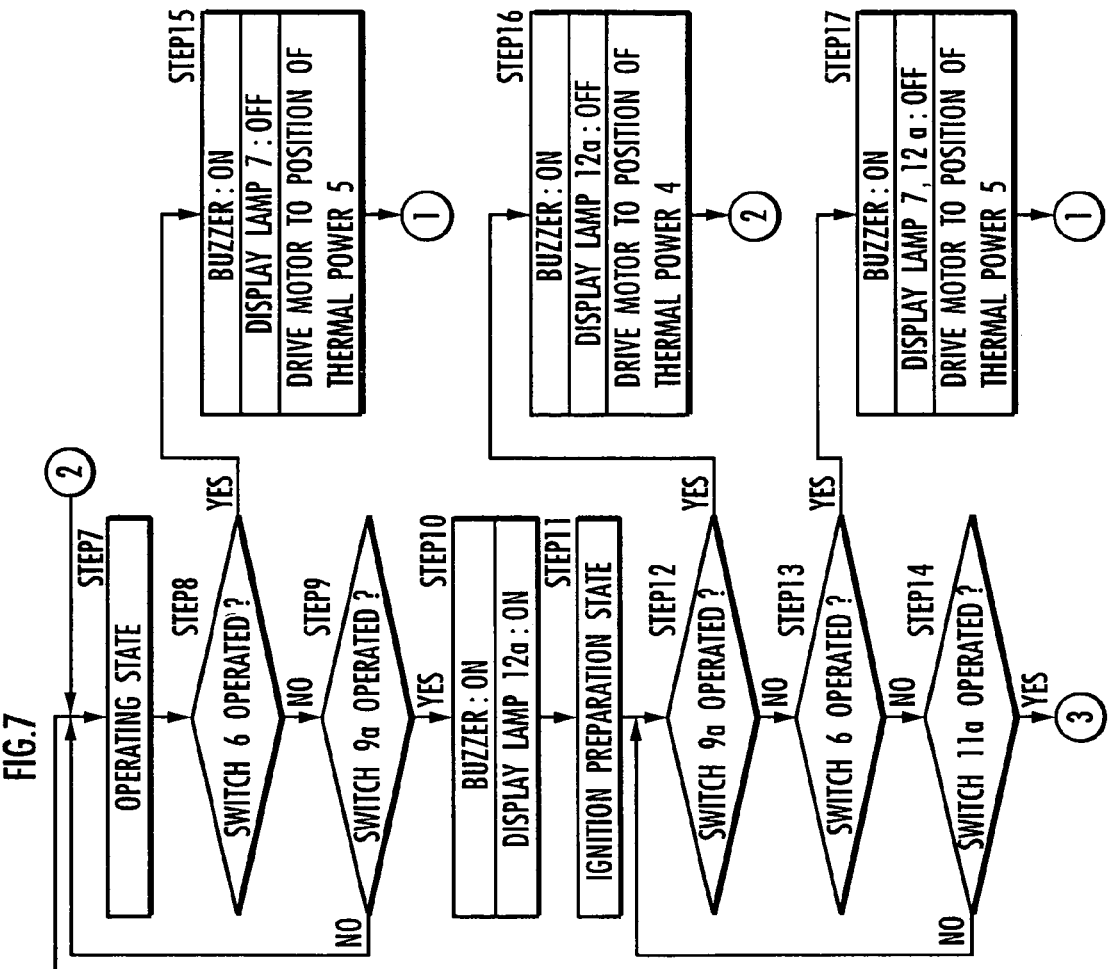
FIG. 7 is a flowchart showing actuation of the gas cooking appliance of FIG. 1.
Figure 8:
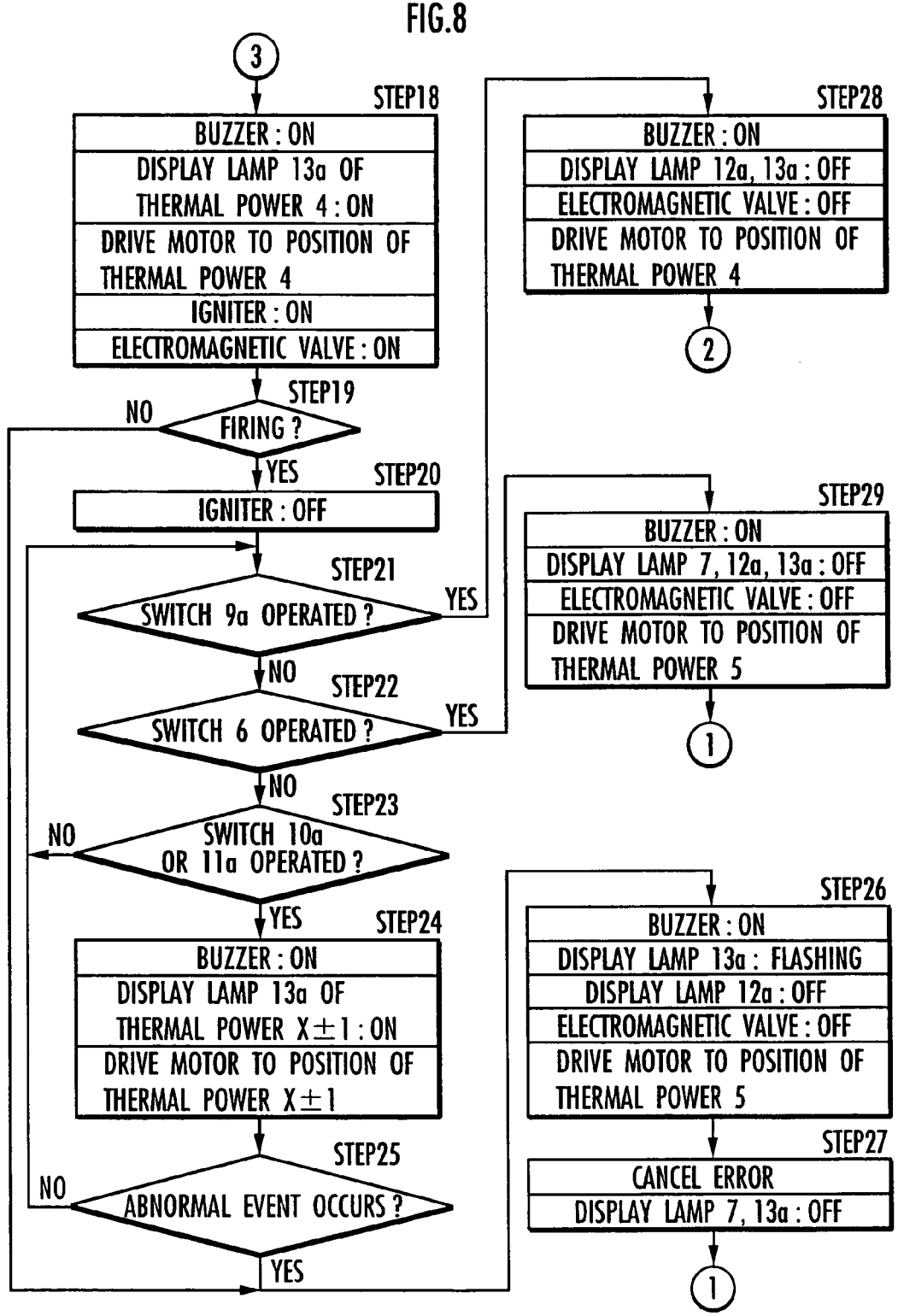
FIG. 8 is a flowchart showing actuation of the gas cooking appliance of FIG. 1.

In FIGS. 7 and 8, "ON" of the buzzer means that the buzzer is temporarily sounded, "ON" and "OFF" of the display lamps 7, 8, 12a, 13a, 12b, 13b mean lighting and light-out, respectively, and "ON" and "OFF" of the electromagnetic valve 22 mean opening and closure of the electromagnetic valve 22, respectively. In the following description, the burner 4b is not operated, but kept in an extinguished state.

When the gas cooking appliance 1 is brought into the operating state at step 7, the microcomputer 51 checks whether the switches 6, 9a are operated or not, based on output signals of the operation switch circuit 52 at STEPs 8, 9. If none of the switches 6, 9a is operated, the operating state continues.

If the switch 6 is operated at STEP 8, the microcomputer 51 carries out the process of STEP 15, and then the gas cooking appliance 1 returns to the "standby state" in STEP 4. At STEP 15, the microcomputer 51 temporarily sounds the buzzer (not shown), lights out the display lamp 7, and drives the motor 29 to a position corresponding to the thermal power 5. Here, the motor driven to the position corresponding to the thermal power 5 refers to both the motor 29 on the burner 4a side and the motor 29 on the burner 4b side. The number of pulses supplied to each motor 29 from the motor drive circuit 54 is the number of pulses equivalent to an angle of rotation of the rotation plate 31 of each thermal power control valve 23 from the current rotation position to a rotation position corresponding to the thermal power 5.

Additionally, if the burning operation of the burner 4b is carried out at the time of determination at STEP 8, the microcomputer 51 closes the electromagnetic valve 22 on the burner 4b side (interrupts passage of an electric current through the electromagnetic valve 22) to extinguish the burner 4b, and then drives both motors 29 to the position corresponding to the thermal power 5 at STEP 15. When both motors 29 are driven at STEP 15, they are driven concurrently in this embodiment, but they may be driven one after another.

If the switch 6 is not operated and the switch 9a is operated (the result of determination at STEP 9 is YES) when the gas cooking appliance 1 is in the operating state, the microcomputer 51 temporarily sounds the buzzer (not shown) and lights up the display lamp 12a at STEP 10. Thus, the gas cooking appliance 1 is brought into the "ignition preparation state" (more specifically, ignition preparation state on the burner 4a side) (STEP 11).

In the ignition preparation state, the microcomputer 51 checks whether the switches 9a, 6, 11a are operated or not based on output signals of the operation switch circuit 52 at STEPs 12 to 14. If none of the switches 9a, 6, 11a is operated, the ignition preparation state continues.

If the switch 9a is operated at STEP 12, the microcomputer 51 carries out the process of STEP 16, and then the gas cooking appliance 1 returns to the operating state in STEP 7 (the ignition preparation state is canceled). At STEP 16, the microcomputer 51 temporarily sounds the buzzer, lights out the display lamp 12a, and drives the motor 29 (specifically, the motor 29 on the burner 4a side) to the position corresponding to the thermal power 4. The number of pulses supplied from the motor drive circuit 54 to the motor 29 on the burner 4a side is a number of pulses equivalent to an angle of rotation of the rotation plate 31 of the thermal power control valve 23 on the burner 4a side from the current rotation position to the rotation position corresponding to the thermal power 4 (rotation position corresponding to the opening degree for ignition of the thermal power control valve 23). The reason why the motor 29 on the burner 4a side is driven to the position corresponding to the thermal power 4 at STEP 16 is that there is a high possibility that the burning operation of the burner 4a is subsequently carried out.

If the switch 6 is operated at STEP 13, the microcomputer 51 carries out the process of STEP 17, and then the gas cooking appliance 1 returns to the standby state in STEP 4. At STEP 17, the microcomputer 51 temporarily sounds the buzzer (not shown), lights out the display lamps 7, 12a, and drives the motor 29 to the position corresponding to the thermal power 5. Here, as in the case of STEP 15 described above, the motor driven to the position corresponding to the thermal power 5 refers to both the motor 29 on the burner 4a side and the motor 29 on the burner 4b side. The supply of pulses to the motors 29 is carried out in the same manner as in STEP 15.

Additionally, if the burning operation of the burner 4b is carried out at the time of determination at STEP 13, the microcomputer 51 closes the electromagnetic valve 22 on the burner 4b side (interrupts passage of an electric current through the electromagnetic valve 22), extinguishes the burner 4b, and then drives both motors 29 to the position corresponding the thermal power 5 at STEP 17 as in the case of STEP 15.

If the switches 9a, 6 are not operated, but the switch 11a is operated (the result of determination at STEP 14 is YES) when the gas cooking appliance 1 is in the ignition preparation state on the burner 4a side, the microcomputer 51 carries out the process of STEP 18. The process of STEP 18 is the ignition process of the burner 4a, and the microcomputer 51 temporarily sounds the buzzer and lights up the LED of the display lamp 13a corresponding to the thermal power 4. The motor 29 on the burner 4a side is driven to the position corresponding to the thermal power 4, the igniter 57 on the burner 4a side is then actuated (the igniter 57 is turned on) via the igniter drive circuit 58, and the electromagnetic valve 22 on the burner 4a side is opened (the supply of gas to the burner 4a is started). The number of pulses supplied to the motor 29 on the burner 4a side when the motor 29 is driven to the position corresponding to the thermal power 4 is a number of pulses equivalent to an angle of rotation of the rotation plate 31 of the thermal power control valve 23 on the burner side 4a from the current rotation position to the rotation position corresponding to the thermal power 4.

In this embodiment, as described in detail later, when the ignition process of the burner 4a is started at STEP 18, the thermal power control valve 23 is displaced to the opening degree position of the thermal power 4 that is to an opening degree for ignition, or the opening degree position of the thermal power 5 higher by 1 step than the thermal power 4. Thus, the thermal power control valve 23 can be quickly displaced to the opening degree position of the thermal power 4. Therefore, the ignition process of the burner 4a can be carried out speedily when the switch 11a is operated (the request occurs for ignition of the burner 4a).

Then, at STEP 19, firing of the burner 4a is observed. If firing of the burner 4a is not observed even if the igniter 57 is operated for a certain time period in the ignition process described above, the microcomputer 51 carries out processes of STEPs 26, 27, and then the gas cooking appliance 1 returns to the standby state in STEP 4. The processes of STEPs 26, 27 will be described later.

If firing of the burner 4a is observed, the microcomputer 51 stops the drive of the igniter 57 (turns the igniter 57 off) at STEP 20. Thereupon, the burning operation of the burner 4a is started.

Then, the microcomputer 51 checks whether the switches 9a, 6, 10a, 11a are operated or not through STEPs 21 to 23 based on output signals of the operation switch circuit 52. If none of the switches 9a, 6, 10a, 11a is operated, the burning operation of the burner 4a continues.

If the switch 9a is operated at STEP 21, the microcomputer 51 carries out the process of STEP 28, and then the gas cooking appliance 1 returns to the operation state in STEP 7. The process of STEP 28 is the extinguishment process of the burner 4a, in which the microcomputer 51 temporarily sounds the buzzer and lights out the display lamps 12a, 13a. Moreover, the microcomputer 51 closes the electromagnetic valve 22 on the burner 4a side to extinguish the burner 4a, and drives the motor 29 on the burner 4a side to the position corresponding to the thermal power 4 for ignition. That is, the thermal power control valve 23 is displaced to the opening degree for ignition. The operation of the motor 29 at this time is carried out by the extinguish time motor controlling means of the microcomputer 51. The number of pulses supplied to the motor 29 on the burner 4a side when the motor 29 is driven to the position corresponding to the thermal power 4 for ignition is a number of pulses equivalent to an angle of rotation of the rotation plate 31 of the thermal power control valve 23 on the burner 4a side from the current rotation position to the rotation position corresponding to the thermal power 4 (rotation position corresponding to the opening degree for ignition of the thermal power control valve 23). The motor 29 may be driven to the position corresponding to the thermal power 4 just after the electromagnetic valve 22 on the burner 4a side is closed.

If the switch 6 is operated at STEP 22, the microcomputer 51 carries out the process of STEP 29, and then the gas cooking appliance 1 returns to the standby state in STEP 4. At STEP 29, the microcomputer 51 temporarily sounds the buzzer and lights out the display lamps 7, 12a, and 13a. The microcomputer 51 closes the electromagnetic valve 22, and drives the motor 29 to the position corresponding to the thermal power 5 for ignition. For the electromagnetic valve 22 closed at this time, only the electromagnetic valve 22 on the burner 4a side is closed if the burning operation of only the burner 4a is carried out, but if the burning operation of the burner 4b is also carried out, the electromagnetic valve 2 on the burner 4b is closed as well. Thus, both burners 4a, 4b are brought into the extinguished state by the process of STEP 29. The motor 29 driven at STEP 29 refers to both the motor 29 on the burner 4a side and the motor 29 on the burner 4b side as in the case of STEP 15 described above. The supply of pulses to each motor 29 is carried out in the same manner as in STEP 15.

If the switches 9a, 6 are not operated, but the switch 10a or 11a is operated during the burning operation of the burner 4a (the result of determination at STEP 23 is YES), the microcomputer 51 temporarily sounds the buzzer, and lights up the LED corresponding to the thermal power X+1 or X−1 (X: current thermal power) of the display lamp 13a at STEP 24. The LED corresponding to the thermal power X+1 (the upper limit of X+1 is "5") if the switch 11a is operated, and the LED corresponding to the thermal power X−1 (the lower limit of X−1 is "1") if the switch 10a is operated. At STEP 24, the microcomputer 51 drives the motor 29 on the burner 4a side to the position corresponding to the updated thermal power X+1 ($\leqq$5) or X−1 ($\geqq$1). In this case, the number of pulses supplied to the motor 29 on the burner 4a is a number of pulses equivalent to an angle of rotation of the rotation plate 31 of the thermal power control valve 23 on the burner 4a side from the rotation position corresponding to the current thermal power to the rotation position corresponding to the updated thermal power X+1 or X−1.

The opening degree of the thermal power control valve 23 is adjusted to be an opening degree corresponding to the updated thermal power X+1 or X−1 by the process of STEP 24.

Then, at STEP 25, the microcomputer 51 checks whether an abnormal event (misfire of the burner 4a, or the like) occurs or not based on outputs of various sensors, and if no abnormal event occurs, the processes beginning in STEP 21 are continued.

If some abnormal event occurs at STEP 25, the microcomputer 51 carries out a process same as the process that would be carried out if firing is not observed at STEP 19 described above, at STEPs 26, 27, and then the gas cooking appliance 1 returns to the standby state in STEP 4.

At STEP 26, the microcomputer 51 temporarily sounds the buzzer, makes the display lamp 13a flash, and lights out the display lamp 12a. The microcomputer 51 closes the electromagnetic valve 22, and drives the motor 29 to the position corresponding to the thermal power 5. For the electromagnetic valve 22 closed at this time, only the electromagnetic valve 22 on the burner 4a side is closed if the burning operation of only the burner 4a is carried out, but if the burning operation of the burner 4b is also carried out, the electromagnetic valve 2 on the burner 4b side is closed as well. Thus, both burners 4a, 4b are brought into the extinguished state by the process of STEP 26. The motor 29 driven at STEP 26 refers to both the motor 29 on the burner 4a side and the motor 29 on the burner 4b side as in the case of STEP 15 described above. The supply of pulses to each motor 29 is carried out in the same manner as in STEP 15.

At STEP 27 subsequent to STEP 26, the microcomputer 51 carries out a predetermined error cancellation process and lights out the display lamps 7, 13a.

In the above description with FIGS. 7 and 8 (description beginning with STEP 7), the operation on the burner 4a side has been mainly described, but the operation on the burner 4b side is carried out in the same manner. In this case, the switches 9a, 10a, 11a in FIGS. 7 and 8 are replaced by the switches 9b, 10b, 11b, respectively, and the display lamps 12a, 13a are replaced by the display lamps 12b, 13b, respectively, FIGS. 7 and 8 serve as flowcharts showing the operation on the burner 4b side. In this case, however, the "motor" in STEPs 16, 18, 24, 28 is the motor 29 on the burner 4b side, and the "electromagnetic valve" in STEPs 18, 28 is the electromagnetic valve 22 on the burner 4b side. Other aspects are same as those in actuation on the burner 4a side.

By the actuation of the gas cooking appliance 1 described above, the process of STEP 16 described above, or the process of STEP 28 in extinguishment of the burner 4a (or 4b) is carried out, whereby when the ignition process of the burner 4a (or 4b) is started at STEP 18, the thermal power control valve 23 on the side of the burner for which the ignition process is carried out is already displaced to the opening degree for ignition except that the switches 9a, 11a are operated on a one-by-one basis or the switches 9b, 11b are operated on a one-by-one basis after the state of the gas cooking appliance 1 is shifted from the standby state to the operating state by the operation of the switch 6. Hence, usually, the actuation of the igniter 57 and the supply of gas to the burner 4a (or 4b) (opening of the electromagnetic valve 22) can be promptly started without actually actuating the motor 29 at STEP 18. Thus, the ignition process of each burner 4a, 4b can be promptly started for the ignition request with the operation of the switch 11a or 11b.

Even if the switches 9a, 11a are operated on a one-by-one basis or the switches 9b, 11b are operated on a one-by-one basis after a shift is made from the standby state to the operating state, the thermal power control valve 23 is displaced to the opening degree position corresponding to the thermal power 5 higher by just one stage than the thermal power 4. Hence, at STEP 18, the thermal power control valve 23 is displaced only by an amount equivalent to one thermal power, and therefore the displacement is done in a sufficiently short time. Thus, even in this case, the ignition process of each burner 4a, 4b can be promptly started for the ignition request with the operation of the switch 11a or 11b.

Additionally, in this embodiment, when the gas cooking appliance 1 is brought into the standby state (at this time, electric power of the main power source is supplied to the electronic circuit unit 50 including the microcomputer 51 and the like, and the supply of gas to both burners 4a, 4b is interrupted), each motor 29 is driven to the position corresponding to the thermal power 5, i.e. the position close to the maximum opening degree of each thermal power control valve 23. The reason of this is as follows. The standby state of the gas cooking appliance 1 is a state in which the burners 4a, 4b are not operated, and therefore when the main power source is interrupted, the interruption is usually done in the standby state of the gas cooking appliance 1. Thus, when the main power source of the gas cooking appliance 1 is interrupted, and then the main power source is turned on again to carry out the process of STEP 2 described above to supply to the motor 29 the number of pulses for shift to the home position, the thermal power control valve 23 is mechanically restrained to the minimum opening degree (home position of the thermal power control valve 23) just before the supply of pulses is completed. Thus, the number of pulses supplied to the motor 29 after the opening degree of the thermal power control valve 23 arrives at the minimum opening degree is very small and as a result, a time period over which a disorder of the motor 29 occurs is very short. Accordingly, occurrence of abnormal sounds and vibrations during the disorder can be limited to only a very short time period. The voltage of the pulse at this time is a low level voltage, the generated torque of the motor 29 is therefore small and as a result, abnormal sounds and vibrations can be limited to a low level.

Additionally, in case where power fails or a plug socket of the main power source is disconnected during the operation of the gas cooking appliance 1 (during the burning operation of burners 4a, 4b, or during the operation of the motor 29), the opening degree of the thermal power control valve 23 is maintained at an opening degree (indefinite) at the time when power fails or the plug socket is disconnected. When electric power of the main power source is then supplied to the gas cooking appliance 1 again, the process of STEP 2 described above is carried out. In this case, the opening degree of each thermal power control valve 23 just before the start of the process of STEP 2 is indefinite, but each motor 29 is supplied with the number of pulses for shift to the home position which is the number of pulses slightly larger than the minimum necessary number of pulses required for displacing the thermal power control valve 23 from the maximum opening degree to the minimum opening degree, thus making it possible to reliably displace each thermal power control valve 23 to the home position.

In the embodiment described above, the minimum opening degree of the thermal power control valve 23 is the home position, but the maximum opening degree may be the home position. Alternatively, when s shift to the home position is made, a stopper may be protruded to a position near the minimum opening degree or the like of the thermal power control valve 23, and a position in which the thermal power control valve 23 is engagedly stopped by the stopper may be defined as the home position.

In the embodiment described above, the motor 29 is driven to the position corresponding to the thermal power 5 for limiting occurrence of a disorder, abnormal sounds and vibrations of the motor 29 to a short time period when the thermal power control valve 23 is shifted to the home position at STEPs 3, 15, 17, 26, 29, but for the embodiment of the present invention, the motor 29 may be driven to the position corresponding to the thermal power 4, i.e. a position in which the thermal power control valve 23 is at the opening degree for ignition, at these STEPs. This ensures that each thermal power control valve 23 is always displaced to the opening degree for ignition in advance when the burners 4a, 4b are ignited, and is thus effective in carrying out the ignition process of the burners 4a, 4b. In this case, when the thermal power control valve 23 is shifted to the home position by open loop control of the motor 29 as in the process of STEP 2 of the embodiment described above, a time period over which the disorder of the motor 29 occurs is longer compared to the embodiment described above, and therefore for preventing this, displacement of the thermal power control valve 23 to the home position may be detected with the proper sensor and the like and accordingly, the drive of the motor 29 may be stopped when the thermal power control valve 23 is shifted to the home position.

In the embodiment described above, an alternating-current power source is used as the main power source of the gas cooking appliance 1, but a battery may be used as a power source. In this case, power capable of being supplied by the battery cannot be so much increased in general, and therefore in the case where a plurality of thermal power control valves driven by the stepping motor are provided as in the gas cooking appliance 1 of the embodiment described above, it is desirable that when the thermal power control valves are shifted to the home position, they should be shifted to the home position one after another. Similarly, when requests are almost concurrently made for extinguishment of a plurality of burners when the burners are burning, the process for driving each motor to the position corresponding to the opening degree for ignition of the thermal power control valve of each burner may be carried out one after another. However, as in the present invention, the thermal power control valve is displaced to the opening degree for ignition during or just after extinguishment of the burner, whereby when requests are almost concurrently made for ignition of a plurality of burners, it is not necessary to actuate motors corresponding to the burners, thus making it possible to carry out ignition processes of a plurality of burners almost concurrently.

In the embodiment described above, the thermal power control valve 23 is driven by the stepping motor 29, but a usual electric motor other than the stepping motor 29 may be used.

What is claimed is:

1. A gas cooking appliance comprising:
    a switch;
    a thermal power control valve provided in a gas flow channel to a burner for controlling the thermal power of the burner;
    an electric motor for driving the thermal power control valve;
    control means for controlling the electric motor via a motor drive circuit; and
    an electromagnetic valve provided in the gas flow channel along with the thermal power control valve,
    wherein said control means comprises extinguishing time motor controlling means for closing the electromagnetic valve to extinguish the burner and actuating said electric motor to displace said thermal power control valve to an ignition position in response to an operation of the switch for extinguishing the burner in a state when the burner is in a burning operation, wherein the ignition position is predetermined as a position of the thermal power control valve at a beginning of ignition of the burner.

2. The gas cooking appliance according to claim 1, wherein said electric motor is a stepping motor which is operated by supplying pulses thereto via said motor drive circuit, and
    said control means comprises means for actuating said stepping motor so that said thermal power control valve is displaced to a predetermined home position when electric source power is supplied to at least the control means and said motor drive circuit, and means for actuating the stepping motor just thereafter so that said thermal power control valve is displaced to said ignition position or a position close thereto.

3. The gas cooking appliance according to claim 1, wherein said gas cooking appliance comprises a plurality of sets of said burner, thermal power control valve, electric motor and motor drive circuit.

* * * * *